United States Patent [19]

Fenoglio

[11] 4,147,895

[45] Apr. 3, 1979

[54] EXPANDABLE MEMORY FOR THE SUPPRESSION OF PHASE JITTER IN A TELECOMMUNICATION SYSTEM

[75] Inventor: Francesco Fenoglio, Milan, Italy

[73] Assignee: Societa Italiana Telecomunicazioni Siemens S.p.A., Milan, Italy

[21] Appl. No.: 862,670

[22] Filed: Dec. 21, 1977

[30] Foreign Application Priority Data

Dec. 23, 1976 [IT] Italy .............................. 30815 A/76

[51] Int. Cl.² ............................................. H04J 3/06
[52] U.S. Cl. .......................... 179/15 AF; 179/15 BA; 179/15 BS; 178/69.1
[58] Field of Search ......... 179/15 AF, 15 BS, 15 BA, 179/15 BV; 178/69.1

[56] References Cited

U.S. PATENT DOCUMENTS

| | | | |
|---|---|---|---|
| 3,504,126 | 3/1970 | Inose et al. | 179/15 BS |
| 3,597,552 | 8/1971 | Goto | 179/15 AF |
| 3,805,180 | 4/1974 | Widmer | 178/69.1 |
| 3,992,581 | 11/1976 | Davis | 178/69.1 |
| 4,025,720 | 5/1977 | Pachynski, Jr. | 179/15 BS |
| 4,058,683 | 11/1977 | Fenoglio | 179/15 BA |
| 4,075,428 | 2/1978 | Ghisler et al. | 179/15 BS |

Primary Examiner—Kathleen H. Claffy
Assistant Examiner—Gerald L. Brigance
Attorney, Agent, or Firm—Karl F. Ross

[57] ABSTRACT

Binary message signals arriving over a PCM link at a retransmitting station, with a predetermined average bit cadence subject to random variations, are cyclically written in an 8-stage buffer register under the control of an 8-pulse writing counter stepped by clock pulses extracted from the incoming bit stream. The contents of the buffer register are read out under the control of an 8-pulse reading counter stepped by a local pulse generator whose pulse rate substantially corresponds to the predetermined cadence. Any deviations of the actual bit rate from the predetermined cadence are detected in a phase comparator receiving mutually interleaved monitoring pulses, once per 8-bit cycle, from the two counters. The comparator comprises a flip-flop whose alternate setting and resetting by the two pulse trains produces a square wave of 50% duty ratio when the counters are in step; otherwise, the detected mean amplitude of the square wave adjusts the operating frequency of a quartz-controlled oscillator, forming part of the local pulse generator, to compensate for the deviation.

8 Claims, 9 Drawing Figures

4,147,895

EXPANDABLE MEMORY FOR THE SUPPRESSION OF PHASE JITTER IN A TELECOMMUNICATION SYSTEM

FIELD OF THE INVENTION

My present invention relates to an expandable memory for the suppression of so-called phase jitter in a telephone or other telecommunication system.

BACKGROUND OF THE INVENTION

In my prior U.S. Pat. No. 4,058,683, issued Nov. 15, 1977, I have disclosed and claimed an expandable memory for use in a telecommunication system in which the bits of lower-order frames, converging at a transmitting terminal, are assembled in interleaved relationship into a higher-order frame to be sent via a PCM link to a receiving terminal for redistribution to respective destinations. In order to harmonize the bit cadence of the higher-order frame, which also contains ancillary bits not present in the constituent lower-order frames, with the bit rates of the latter frames even though the higher bit rate is not an exact multiple of the lower one, stuffing bits are inserted from time to time into the constituent bit streams in lieu of message bits otherwise present therein, the stuffing bits being subsequently eliminated at the receiving end. The presence of a stuffing bit is marked by one or more discriminating bits preceding it in the higher-order frame, preferably three such bits whose binary value can be detected by majority logic to guard against transmission errors.

The transmitting terminal of the system referred to includes a number of expandable memories equal to the number of constituent bit streams (four in the embodiment specifically disclosed) which serve for the selective insertion of a stuffing bit. A like number of expandable memories are provided at the receiving terminal to facilitate the suppression of the stuffing and ancillary bits introduced at the transmitting terminal.

In such a system, the several output leads of a demultiplexer provided at the receiving terminal are representative of a variety of sources of binary signals having a predetermined average bit cadence subject to random variations. If it is desired to retransmit these several bit streams to their individual destinations with a substantially constant bit rate, the incoming bits will have to be stored in a buffer register from which they are read out at a rate equalling the average rate at which they are received. This calls for an expandable memory which, aside from having means for suppressing unwanted bits (as shown in my prior patent), also includes a local pulse generator whose operating frequency adjusts itself automatically to the instantaneous mean cadence of the incoming bits; by "instantaneous mean cadence" is meant the bit rate averaged over a relatively short period, such as the duration of a frame in the aforedescribed telecommunication system, as distinct from the average cadence measured over a large number of successive frame periods during which the number of message bits is subject to change by the insertion of a stuffing bit.

OBJECTS OF THE INVENTION

The general object of my present invention, accordingly, is to provide an efficient, highly precise expandable memory for the suppression of phase jitter, readily adjustable to different bit cadences.

A more specific object is to provide an expandable memory of this type particularly adapted for use in a receiving terminal of a PCM telecommunication system as described in my prior U.S. Pat. No. 4,058,683.

SUMMARY OF THE INVENTION

An expandable memory according to my present invention comprises an n-stage register for the temporary storage of n consecutive incoming bits, the recurrent loading of the register stages being timed by writing-control means responsive to a train of first clock pulses extracted from the incoming bit stream while the unloading of these stages is timed by reading-control means responsive to a train of second clock pulses from a local pulse generator with an adjustable operating frequency. This operating frequency, which is on the order of the predetermined average bit cadence of the incoming bit stream, is continuously adjusted by synchronizing means including a phase comparator with inputs connected to the writing-control and reading-control means for feeding back a control signal to the pulse generator, thereby maintaining the unloading of the register stages substantially in step with their loading.

According to a more particular feature of my invention, the writing-control means comprises a first n-pulse counter stepped by the extracted first clock pulses to produce a first monitoring pulse on every $n^{th}$ clock pulse applied thereto, the reading-control means similarly comprising a second n-pulse counter stepped by the locally generated clock pulses to produce a second monitoring pulse on every $n^{th}$ clock pulse fed to it. The two sequences of monitoring pulses are fed to respective inputs of a flip-flop for alternately setting and resetting same to generate a square wave with a 50% duty ratio upon exact interleaving of these sequences, with a relative offset of n/2 clock pulses. Integration of this square wave in a filter stage derives therefrom the aforementioned control signal which varies the operating frequency of the local pulse generator to maintain that offset.

The use of a flip-flop of JK type, alternating between a set and a reset state upon consecutive triggering of a switching input, allows the generation of a reference square wave of half the normal operating frequency—again with a 50% duty cycle—if only the locally generated second monitoring pulses are applied to that switching input, i.e. if the feed of the first monitoring pulses to a resetting input of the flip-flop is blocked by selectively operable switchover means. Such a reference square wave can be used for calibrating the local pulse generator, e.g., with the aid of a manually settable potentiometer feeding a biasing signal to a voltage-responsive frequency-determining element such as a varactor in the tank circuit of an oscillator—preferably of the crystal-controlled type—forming part of that pulse generator.

BRIEF DESCRIPTION OF THE DRAWING

The above and other features of my invention will now be described in detail with reference to the accompanying drawing in which.

SPECIFIC DESCRIPTION

Figure 1:
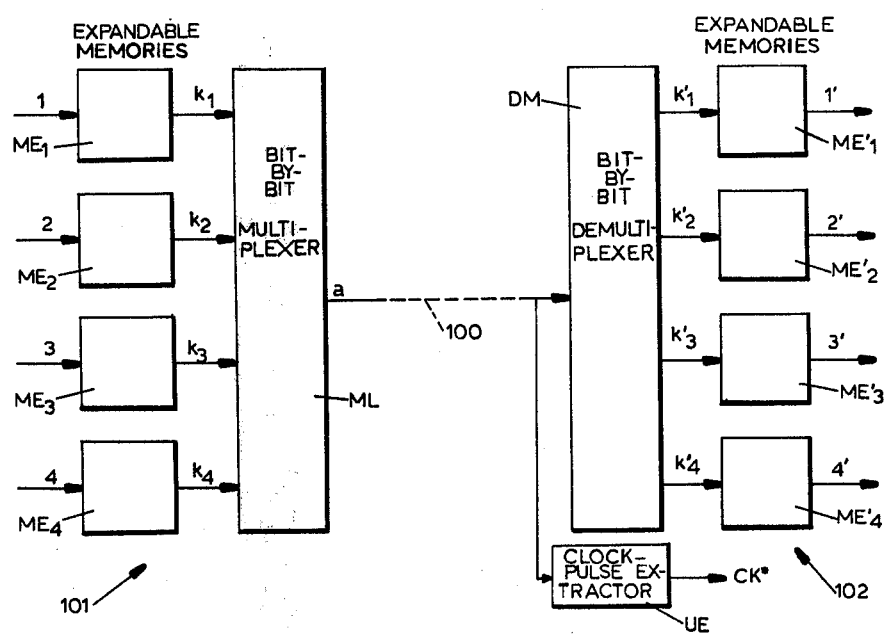
FIG. 1 is a diagrammatic view of a PCM telecommunication system similar to that shown in my prior U.S. Pat. No. 4,058,683.

In FIG. 1 I have shown a PCM telecommunication system of the kind disclosed in my prior U.S. Pat. No. 4,058,683, comprising a transmitting terminal 101 and a receiving terminal 102 interconnected by a PCM link 100. Four different bit streams organized in the form of a recurrent lower-order frame with a cadence of 8.448 Mbits/sec arrive simultaneously at the transmitting terminal 101 on incoming lines 1–4 and are relayed by respective expandable memories $ME_1$–$ME_4$ over output leads $k_1$, $k_2$, $k_3$, $k_4$ to a multiplexer ML for bit-by-bit interleaving into a recurrent higher-order frame a sent over link 100 at a frequency $F_m=34.368$ Mbits/sec as determined by locally generated clock pulses. The constituent bits of the composite bit stream arriving at the receiving terminal 102 are redistributed in their original order by a bit-by-bit demultiplexer DM via four outputs leads $k_1'$, $k_2'$, $k_3'$, $k_4'$ to respective expandable memories $ME_1'$–$ME_4'$ according to my present invention working into four outgoing lines $1'$–$4'$.

Figure 8A:
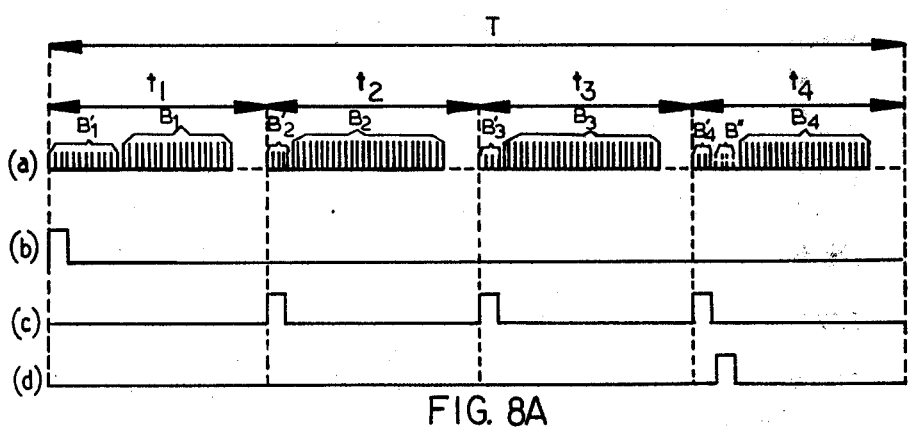
FIG. 8A and 8B are two sets of graphs relating to the operation of the expandable memory shown in FIG. 2.

In FIG. 8A I have shown a timing diagram in which composite frame a, of a period T and subdivided into subframes of respective periods $t_1$, $t_2$, $t_3$, $t_4$, is represented by the correspondingly designated graph (a). Each subframe contains a large number of message bits $B_1$–$B_4$ (long strokes) originating in the constituent bit streams and a small number of ancillary bits $B_1'$, $B_2'$, $B_3'$, $B_4'$ (short strokes) inserted into these bit streams by transmitting memories $ME_1$–$ME_4$, as described in my above-identified prior patent. The ancillary bits $B_1'$ of the first subframe carry supervisory information such as synchronizing signals, alarm signals, and distribution signals identifying the sources of the several interleaved bit streams. The fourth subframe of frame a also includes four ambivalent bits B" (broken lines) serving either as stuffing bits (logic value "0") or as message bits (logic value "1" or "0"). The stuffing bits, designed to harmonize the average bit cadence in the output of multiplexer ML with the actual cadence of bits arriving over lines 1–4, are generated in the transmitting memories $ME_1$–$ME_4$, as described in my prior patent, and are eliminated by the receiving memories $ME_1'$–$ME_4'$ as described more fully hereinafter. Upon leaving the demultiplexer DM, the four constituent frames each contain three of the 12 bits $B_1'$ and one of the four bits $B_2'$, $B_3'$, $B_4'$ as well as B" appearing in relatively staggered time positions in graph (a).

At the transmitting terminal 101, the character of bits B" is indicated by the three discriminating bits $B_2'$, $B_3'$, $B_4'$ of the corresponding bit group which, in the embodiment here described, are all "0" in the case of a message bit and are all "1" in the case of a stuffing bit.

Figure 2:
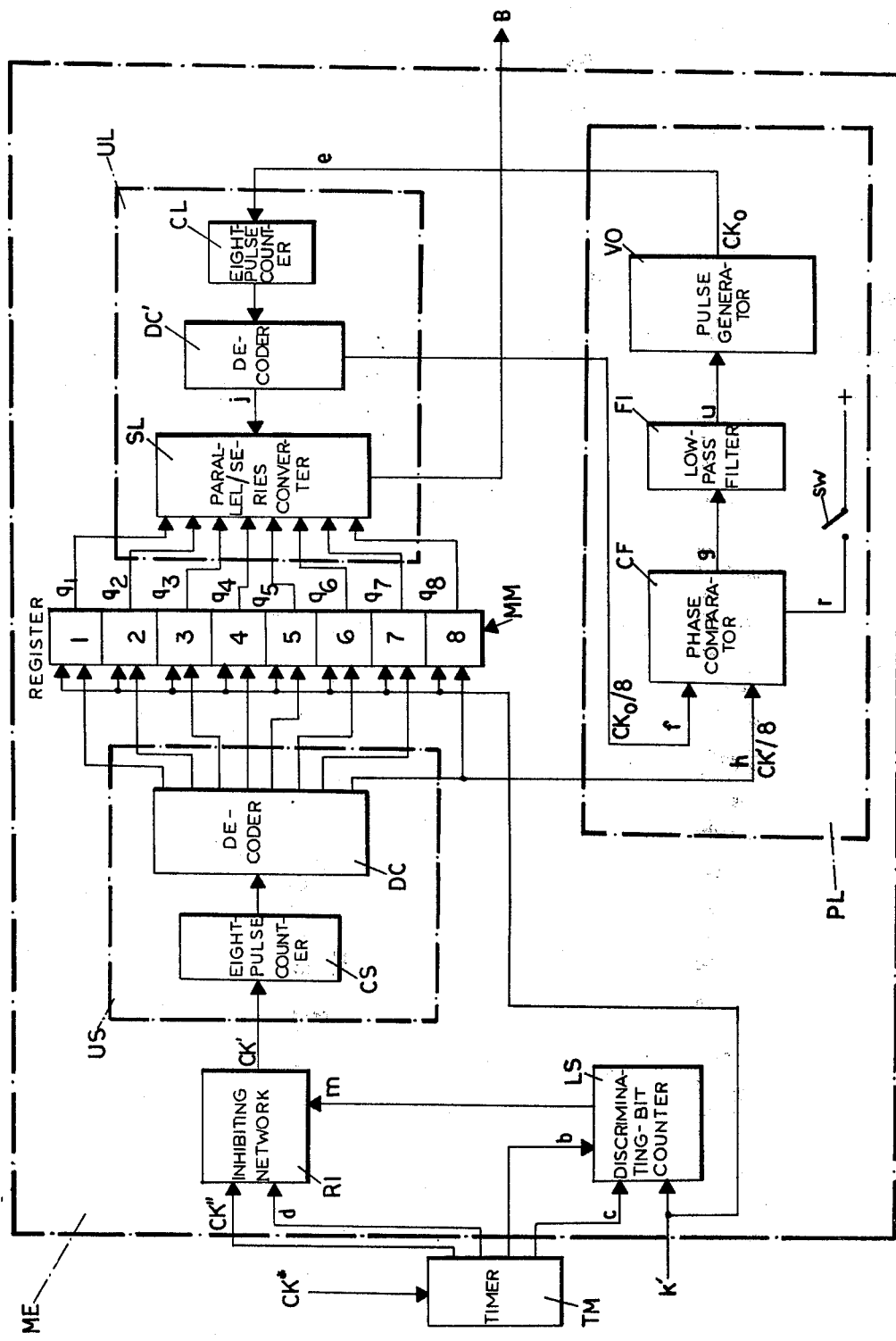
FIG. 2 is a more detailed circuit diagram of an expandable receiving memory forming part of the system of FIG. 1.

Reference will now be made to FIG. 2 which shows an expandable memory ME' according to my present invention, representative of any of the receiving memories $ME_1'$–$ME_4'$ of FIG. 1.

This Memory ME' comprises an 8-stage buffer register MM for temporarily retaining message bits delivered over an input lead k' from demultiplexer DM (FIG. 1), a writing section US controlling the loading of register MM with these bits, a reading section UL controlling the unloading of that register in a continuous outgoing bit stream B, and a phase-locking circuit PL for automatically conforming the readout rate from register MM to the instantaneous mean writing rate which is subject to random variations due to the presence of gaps in the bit stream arriving on lead k', these gaps being created by the suppression of bits B" characterized as stuffing bits by the three preceding discriminating bits.

Writing section US comprises an 8-pulse binary counter CS stepped by a pulse train CK' derived from the incoming bit stream, this counter feeding a decoder DC for the sequential energization of writing-control inputs of the several stages of register MM. The contents of these stages, updated with every eight clock pulses CK', pass over leads $q_1$–$q_8$ to a parallel/series converter SL stepped through a decoder DC' by another 8-pulse binary counter CL at the cadence of a pulse train $CK_o$ locally generated by a component VO of phase-locking circuit PL. Pulse generator VO has a biasing lead u energized, via a low-pass filter FI, by the output g of a comparator CF whose input leads f and h are tied to the eight-stage outputs of decoders DC' and DC for receiving monitoring-pulse trains $CK_o/8$ and $CK'/8$ respectively marking the completion of every unloading and loading cycle. If these pulse trains are relatively staggered by about four clock cycles, the biasing voltage on lead u holds the operating frequency of oscillator VO constant.

Figure 3:
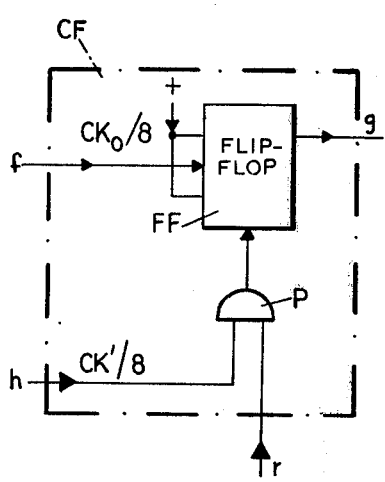
FIGS. 3–7 are logic diagrams of several components of the memory shown in FIG. 2.

FIG. 3 shows details of the comparator CF illustrated in FIG. 2. Comparator CF includes a flip-flop FF of JK type, with positively biased data inputs, whose switching input is tied to lead f and which also has a resetting input tied to an AND gate P having input leads h and r; the latter lead extends to positive potential by way of a manually controlled switch SW (FIG. 2).

Figure 4:
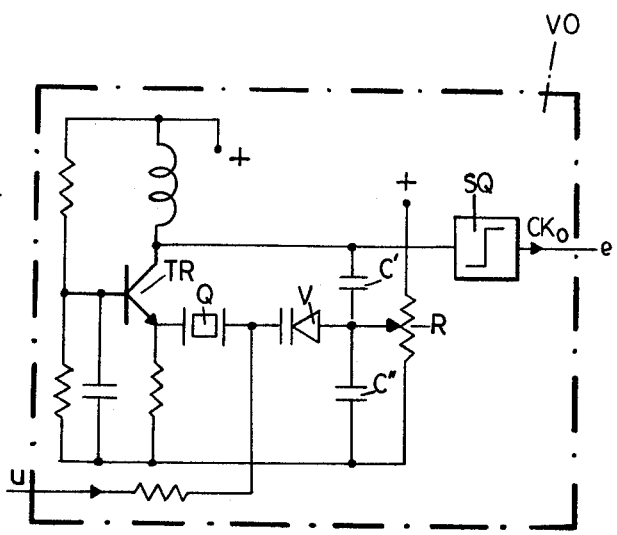

As shown in FIG. 4, pulse generator VO comprises a Colpitts oscillator whose active element is a transistor TR and whose tank circuit includes a capacitive voltage divider C', C" with a regenerative-feedback connection constituted by a variable capacitor or varactor V in series with a quartz crystal Q. The capacitance of varactor V, supplementing that of the frequency-determining crystal Q, is automatically adjustable by the biasing voltage on lead u, connected to the cathode of the varactor, and is manually adjustable by a calibrating voltage derived from a potentiometer R connected to the anode thereof which is tied to the junction of capacitors C' and C". Potentiometer R is used for an initial frequency setting designed to compensate for the unavoidable manufacturing tolerances of mass-produced electrical elements.

Figure 8B:
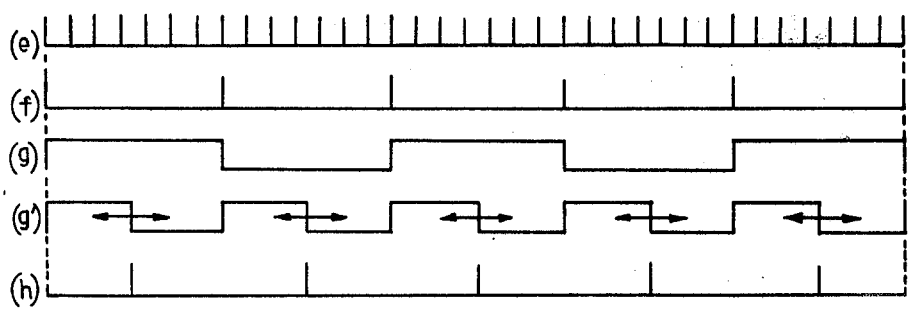

A squarer SQ converts the sinusoidal oscillator output into a sequence of clock pulses $CK_o$ shown in graph (e) of FIG. 8B, these pulses appearing on a lead e extending from generator VO to a stepping input of counter CL. Graphs (f) and (h) represent the stepped-down monitoring-pulse trains $CK_o/8$ and $CK'/8$ on leads f and h, respectively. Graph (g) shows a square-wave reference signal present on the output lead g of flip-flop FF which is alternately set and reset by successive pulses $CK_o/8$ during the inhibition of gate P by the open-circuiting of switchover lead r. From this reference wave, having a 50% duty ratio independent of the relative phasing of pulse trains $CK_o/8$ and $CK'/8$, filter FI (operating as an integrating stage) extracts a d-c voltage having a magnitude equal to the mean amplitude of the square wave. With varactor V biased by this constant potential, potentiometer R is manipulated until the operating frequency of generator VO equals the average cadence of the bit stream on lead k' (FIG. 2), i.e., 8.448 Mbits/sec in the specific instance here envisaged.

Once phase-locking circuit PL is thus calibrated, it may be set for automatic operation by closure of switch SW to unblock the gate P. Flip-flop FF, now being reset by a pulse CK'/8 at the end of every loading cycle of register MM, emits on lead g a square wave of twice the previous frequency as represented in graph (g') of FIG. 9. This new square wave has falling edges, coincident with pulses CK'/8, whose time position relative to the rising edges generated by pulses $CK_o/8$ varies with the phase shift between the incoming and outgoing bit streams.

Figure 5:
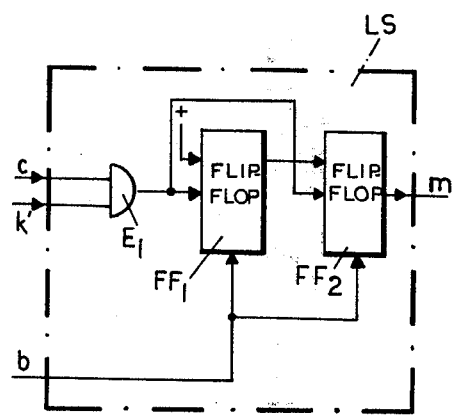

The clock pulses CK' fed to writing counter CS are derived from an extraction unit UE shown connected in FIG. 1 to the incoming end of PCM link 100 to produce a train of pulses CK of a recurrence rate equal to the bit cadence of frame a, i.e., 34.368 Mbits/sec in the system here contemplated. This pulse train is fed to a timer TM, FIG. 2, which emits a modified train CK" lacking a clock pulse in the positions of ancillary bits $B_1'-B_4'$ as shown in the prior patent. Timer TM also emits a zeroizing pulse on a lead b, at the beginning of each frame a, as well as three gating pulses per frame on a lead c and a further gating pulse on a lead d, as shown in graphs (b), (c) and (d) of FIG. 8A. A detector LS for the discriminating bits $B_2'-B_4'$, whose time positions coincide with the pulses on lead b, comprises a two-stage binary counter consisting of two cascaded flip-flops $FF_1$ and $FF_2$ as shown in FIG. 5, each similar to flip-flop FF of FIG. 3. The switching inputs of both flip-flops are connected to the output of an AND gate $E_1$ whose two inputs are tied to leads c and k', each flip-flop further having a resetting input tied to lead b.

Figure 6:
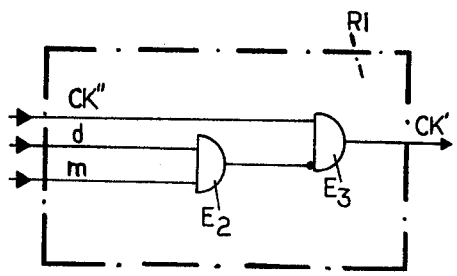

The coincidence of a gating pulse on lead c and a discriminating pulse of logic level "1" on lead k' sets the flip-flop $FF_1$; a recurrence in the same frame, before the appearance of the next zeroizing pulse on lead b, also sets the flip-flop $FF_2$ whose output is a lead m extending to an inhibiting network RI more fully illustrated in FIG. 6. Leads m and d terminate at an AND gate $E_2$ working into an inverting input of another AND gate $E_3$ whose second, non-inverting input receives the modified clock pulses CK". Thus, the train of clock pulses CK' appearing in the output of gate $E_3$ lacks the stuffing bit B" as well as all the previously eliminated ancillary bits $B_1'-B_4'$.

The instantaneous mean frequency of pulse train CK', averaged over the period T of frame a, will have a value of 8.457 Mbits/sec when bit B" is a message bit and a value of 8.435 Mbits/sec when it is eliminated as a stuffing bit. When averaged over the long term, namely a number of successive frame periods large enough to encompass frames both with and without stuffing bits, the pulse rate of train CK' equals 8.448 Mbits/sec as noted in the prior patent; this equals the rated operating frequency of the calibrated pulse generator VO.

Though the actual pulse rate in the first subframe is slightly smaller than in the other three subframes, owing to the elimination of three bits per constituent group during period $t_1$ as against one bit each in periods $t_2$ and $t_3$ and one or two bits in period $t_4$, that difference is not sufficient to cause a significant shift between monitoring pulses $CK_o/8$ and CK'/8 as long as the operating frequency of pulse generator VO remains close to the aforestated values of 8.457 and 8.435 Mbits/sec. Thus, filter FI of FIG. 2 may be an integrating network with a time constant on the order of frame period T.

Figure 7:
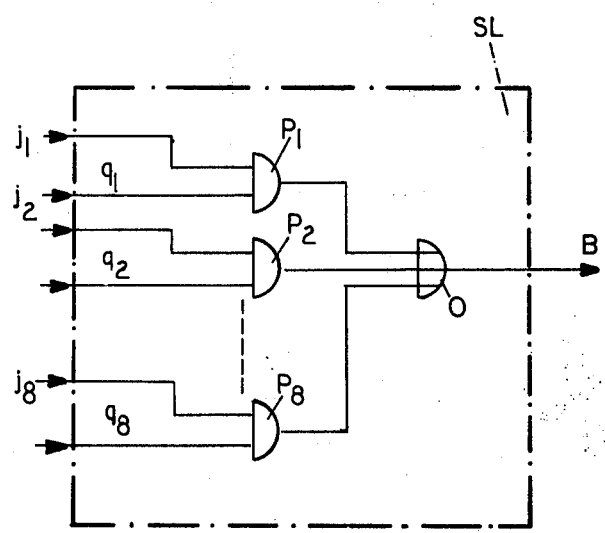

As shown in FIG. 7, the parallel/series converter SL comprises eight AND gates $P_1-P_8$ with one set of input leads $q_1-q_8$ tied to the several stages of register MM and another set of input leads $j_1-j_8$ extending from decoder DC' (FIG. 2) as part of an output multiple j thereof. The binary output signals of the cyclically unblocked AND gates $P_1-P_8$ are serialized by an OR gate O omitting the outgoing bit stream B.

Although particularly described with reference to a telecommunication system operating with interleaved PCM frames, the expandable memory according to my invention may also be used in any other system in which the cadence of an incoming bit stream deviates from a predetermined mean. If no incoming bits are to be suppressed, the clock extractor UE of FIG. 1 works directly into the pulse counter CS of FIG. 2 with omission of the intervening components. The easy adjustability of pulse generator VO enables ready adaptation of this memory to a wide variety of operating conditions.

I claim:
1. In a telecommunication system wherein a transit station receives an incoming bit stream forming a succession of frames, with a predetermined average bit cadence subject to random variations due to the presence of stuffing bits in certain of said frames accompanied by discriminating bits indicative of the presence of said stuffing bits, for retransmission over an outgoing signal path with a substantially uniform bit rate after interim storage in an expandable memory, the improvement wherein said expandable memory comprises:

register means with n stages for the temporary storage of n consecutive incoming bits;

writing-control means including a first n-pulse counter stepped by a train of first clock pulses extracted from said bit stream for timing the recurrent sequential loading of said stages at a rate corresponding to the instantaneous mean cadence of said incoming bits;

a detector for said discriminating bits;

inhibiting means upstream of said writing-control means for suppressing a first clock pulse in a time position allocated to a stuffing bit under the control of said detector;

local pulse-generating means with an adjustable operating frequency of the order of said predetermined cadence producing a train of second clock pulses;

reading-control means including a second n-pulse counter stepped by said train of second clock pulses for timing the recurrent sequential unloading of said stages at a rate substantially corresponding to said instantaneous mean cadence; and synchronizing means for continuously adjusting said operating frequency to maintain said reading-control means substantially in step with said writing-control means, said synchronizing means including a phase comparator with inputs connected to said writing-control means and to said reading-control means for feeding back a control signal to said pulse-generating means, said phase comparator including a flip-flop with a first input connected to said first counter for receiving therefrom a first monitoring pulse on every $n^{th}$ first clock pulse and with a second input connected to said second counter for receiving therefrom a second monitoring pulse on every $n^{th}$ second clock pulse but with an offset of approximately n/2 clock pulses relative to said first monitoring pulse, said flip-flop being settable by one of said monitoring pulses and resettable by the other of said monitoring pulses for generating a square wave with a 50% duty ratio upon exact interleaving of successive first and second monitoring pulses, said synchronizing means further including an integrating stage fed by said flip-flop for deriving said control signal from the square wave.

2. The improvement defined in claim 1 wherein said pulse-generating means comprises a voltage-controlled oscillator with a biasing lead connected to said integrating stage.

3. The improvement defined in claim 2 wherein said flip-flop is provided with switchover means for establishing a 50% duty cycle independent of the relative offset of said first and second monitoring pulses, further comprising calibrating means for manually adjusting the frequency of said oscillator upon actuation of said switchover means.

4. The improvement defined in claim 3 wherein said second input is a switching input for alternately setting and resetting said flip-flop upon consecutive energizations thereof, said first input being a resetting input, said switchover means being inserted in series with said resetting input for blocking the application of said first monitoring pulses thereto.

5. The improvement defined in claim 2 wherein said oscillator has a tank circuit including a varactor connected to said biasing lead.

6. The improvement defined in claim 5 wherein said tank circuit further includes a piezoelectric crystal in series with said varactor.

7. The improvement defined in claim 1 wherein said discriminating bits recur in three time positions of a frame preceding the time position allocated to a stuffing bit, said detector means comprising a two-stage binary counter resettable by a recurrent zeroizing pulse coinciding with the beginning of each frame, said inhibiting means being responsive to a stepping of said binary counter by at least two successive discriminating bits.

8. The improvement defined in claim 1 wherein said expandable memory further comprises a parallel-series converter with n coincidence gates having inputs respectively connected to said n stages of said register means, said coincidence gates having other inputs connected to said reading-control means for successive energization at said operating frequency, said converter further including a summing gate with inputs connected to the outputs of all said coincidence gates.

* * * * *